United States Patent [19]

Weckenbrock

[11] Patent Number: 4,868,650
[45] Date of Patent: Sep. 19, 1989

[54] CIRCUITRY FOR EXPANDING THE EFFECT OF A VIDEO CONTROL SIGNAL IN MULTIPLE DIMENSIONS

[75] Inventor: Hermann J. Weckenbrock, Bordentown, N.J.

[73] Assignee: RCA Licensing Corporation, Princeton, N.J.

[21] Appl. No.: 164,766

[22] Filed: Mar. 7, 1988

[51] Int. Cl.$^4$ .......................... H04N 7/12; H04N 9/78
[52] U.S. Cl. ........................................ 358/105; 358/31
[58] Field of Search .................. 358/105, 31, 36, 167, 358/166, 37, 11

[56] References Cited

U.S. PATENT DOCUMENTS

| | | | |
|---|---|---|---|
| 4,064,530 | 12/1977 | Kaiser et al. | 358/36 |
| 4,141,035 | 2/1979 | Maxemchuck et al. | 358/31 |
| 4,163,249 | 7/1979 | Michael et al. | 358/22 X |
| 4,539,594 | 9/1985 | Illetschko | 358/167 |
| 4,639,784 | 1/1987 | Fling | 358/167 |
| 4,679,086 | 7/1987 | May | 358/105 X |
| 4,730,217 | 3/1988 | Torge et al. | 358/105 X |
| 4,733,297 | 3/1988 | Katsumata et al. | 358/105 |
| 4,760,446 | 7/1988 | Ninomiya et al. | 358/136 X |

OTHER PUBLICATIONS

J. O. Drewery et al., "Video Noise Reduction", BBC Research Dept. Report BBC RD 1984/7, Jul. 1984, pp. 1-49.

Exhibit A—Confidential Schematic Diagram received from Hitachi Corp.

*Primary Examiner*—James J. Groody
*Assistant Examiner*—Victor R. Kostak
*Attorney, Agent, or Firm*—Joseph S. Tripoli; Eric P. Herrmann; James B. Hayes

[57] ABSTRACT

A control signal spreader for ameliorating undesirable effects of abrupt changes in a control signal in a video signal processor gradually changes the magnitude of the control signal in the horizontal, vertical and temporal dimensions of the video signal. The control signal is applied to a first circuit, which, responsive to positive transitions of the control signal, generates a gradually increasing signal and provides the lesser valued one of the control signal and the generated signal. A delayed version of the control signal is applied to a second circuit, which, responsive to negative transitions of the control signal, generates a gradually decaying signal and provides the greater valued one of the control signal and the generated decaying signal. The first and second circuits are coupled to a third circuit which provides as an output control signal, the greater valued signal provided by the first and second circuits.

6 Claims, 5 Drawing Sheets

CIRCUITRY FOR EXPANDING THE EFFECT OF A VIDEO CONTROL SIGNAL IN MULTIPLE DIMENSIONS

The present invention relates to a system for spreading transitions between regions of an image transmitted by a television signal which are processed in a first way and those which are processed in a second different way.

Processing of standard television signals, (such as NTSC or PAL), which represent images, is often changed to adapt to the environment of the signal. This adaptive processing can result in some regions of an image being processed in one way and other adjoining regions being processed in a different way. If the processing differences can be perceived by a viewer, the different regions, and the transition between them, can be discerned, and image quality is degraded.

For example, when separating chrominance and luminance components from the composite video signal, a frame comb filter may be used. As long as there is no change in the image over a frame time interval, the luminance and chrominance components can be completely separated. If the scene changes over the frame time interval, then some color information will be present in the separated luminance component and some brightness information will be present in the chrominance component.

A line comb filter will also separate the luminance and chrominance components from the composite video signal and does not produce significantly degraded component signals in the presence of image motion. However, a line comb filter reduces the vertical resolution of the reproduced image relative to a frame comb filter. In addition, in locations where a vertical transition occurs, an image processed by a line comb filter may be degraded due to color information being introduced into the luminance component, producing an image artifact known as hanging dots; and brightness information being introduced into the chrominance, producing incorrect colors in the neighborhood of the transition.

The television signal may be adaptively processed by detecting the presence or absence of image motion. In regions in which the image is stationary, the frame comb filter is used, and in regions in which the image is changing, the line comb filter is used.

Another example of such adaptive processing is an adaptive double-scanned non-interlaced scan converter. In such a converter, interstitial lines are displayed between lines of the current field. The interstitial lines may be those from the preceding field, however, in the presence of image changes, visible artifacts, such as serrated edges, occur. The interstitial lines may also be interpolated from lines within the current field, but the vertical resolution is reduced and line flicker may occur. In regions in which image changes are detected, intrafield interpolated interstitial lines are displayed and field-delayed interstitial lines are displayed otherwise.

Yet another example is an adaptive peaking circuitry in which regions having relatively high noise are processed with a relatively low peaking factor and regions having relatively low noise are processed with a relatively high peaking factor.

In all of the above examples, the processing of the television signal is changed in response to the value of an estimated parameter of the image. The parameter is motion in the case of luminance/chrominance separation and double scanning non-interlaced conversion, and it is the relative level of noise in the case of the peaking. Differently processed regions, and noticeable boundaries between those regions where the parameter is present and where it is absent is an undesirable artifact introduced by the above types of adaptive processing. It is desirable to reduce the visibility of this artifact in such systems and thereby improve the perceived quality of the image.

In accordance with principles of the present invention, a parameter of the composite video signal is estimated for points in the image. A control signal is then generated based on the parameter. This control signal may be used to control the selection of processing modes. The value of the control signal is then spread symmetrically in a gradually decreasing manner around the region in which the control signal is generated in at least one direction. This generates a region in which the processing gradually changes from a region in which one type of processing is performed to that in which the other type of processing is performed. In the drawings:

The illustrated embodiment described below will be discussed in terms of a motion adaptive luminance/chrominance separator. A similar arrangement could be used for other adaptive processing circuits such as double scanned noninterlaced adaptive scan conversion, or adaptive peaking.

Figure 1:
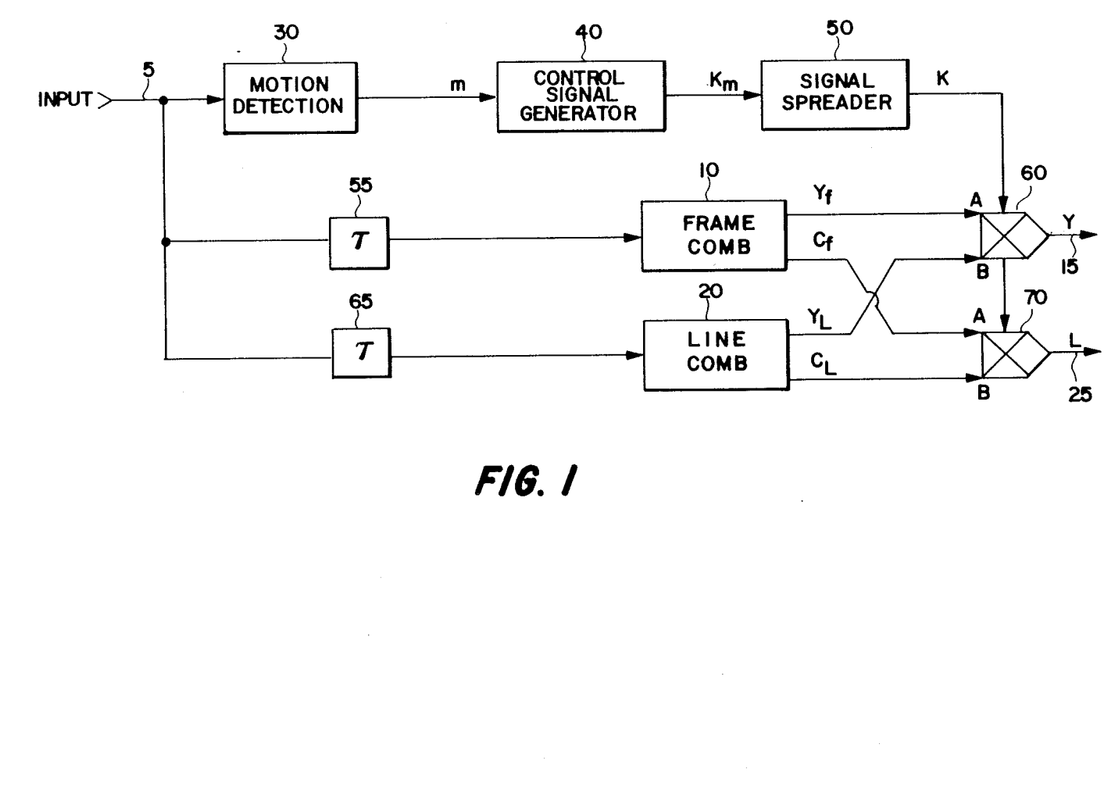
FIG. 1 is a block diagram of a signal spreading system for use in motion adaptive luminance/chrominance separation.

In FIG. 1 an input terminal 5 is coupled to a source (not shown) of a composite video signal such as the output of the video detector of a standard television receiver. Input terminal 5 is coupled to an input terminal of a pixel motion detector 30 and to respective input terminals of a frame comb filter 10 and a line comb filter 20 through equalizing delays 55 and 65 respectively. A luminance output terminal from the frame comb filter 10 supplies a signal $Y_f$ and luminance output terminal from line comb filter 20 supplies a signal $Y_1$, which are coupled to respective input terminals A and B of signal combiner 60. An output terminal 15 of signal combiner 60 is coupled to a luminance signal processing channel (not shown).

A chrominance output terminal from frame comb filter 10 supplies a signal $C_f$ and the chrominance output terminal from line comb filter 20 supplies a signal $C_1$, which are coupled to respective input terminals A and B of a signal combiner 70. An output terminal 25 of signal combiner 70 is coupled to a chrominance signal processing channel (not shown).

An output terminal of image motion detector 30 supplies a signal m and to an input terminal of a soft switch control signal generator 40. A control signal $K_m$ is generated at an output terminal of control signal generator 40 and indicates the relative amounts of frame comb filtered and line comb filtered signal to be supplied to the luminance and chrominance signal processing channels. The output terminal of control signal generator 40 is coupled to an input terminal of a signal spreader 50. Signal spreader 50 generates a signal K which controls spreading of the control signal $K_m$ symmetrically in the region immediately surrounding the pixel currently being processed in the vertical and horizontal direction and allows the control signal to gradually decay in successive fields. The output terminal of signal spreader 50 is coupled to control input terminals of signal combiners 60 and 70 respectively.

In the operation of the luminance/chrominance separator illustrated in FIG. 1, the frame comb filtered luminance $Y_f$ and chrominance $C_f$ signals are the preferred signals to be fed to the luminance and chrominance signal processing channels respectively. When motion is detected, however, the line comb filtered luminance $Y_1$ and chrominance $C_1$ signals should be supplied to the luminance and chrominance signal processing channels respectively in order to minimize artifacts due to image motion. Image motion detector 30 evaluates the input composite video signal from input terminal 5 and generates a signal which, for example, indicates the presence or absence of motion in the image being transmitted. This parameter m is an estimate of the relative amounts of motion at a particular pixel location over preceding image time intervals.

Figure 2:
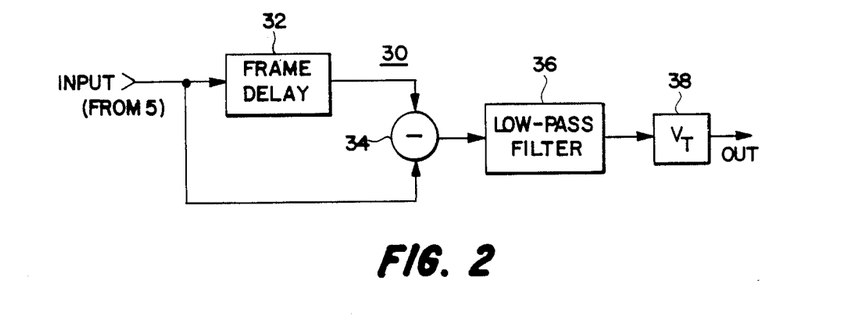
FIG. 2 is a block diagram of an image motion detector which may used in apparatus illustrated in FIG. 1.

FIG. 2 illustrates a known image motion detector 30 which may be used in the system illustrated in FIG. 1. In FIG. 2, an input terminal is coupled to input terminal 5 (of FIG. 1). This input terminal is coupled to an input terminal of a frame time interval delay element 32 and one input terminal of a subtracter 34. An output terminal of frame delay element 32 is coupled to a second input terminal of subtracter 34. An output terminal of subtracter 34 is coupled to the input terminal of the control signal generator 40 (of FIG. 1) through the serial connection of a low pass filter 36 and a threshold detector 38. The threshold detector 38 produces zero and one values for the magnitude of the signal provided by filter 36 being respectively lesser and greater than a predetermined value (i.e. threshold value).

In operation, subtracter 34 produces a signal which represents the difference in value between pixels located at the same horizontal and vertical location in the image over a frame time interval. If these pixels are the same, then no change has occurred, and the output of subtracter 34 is 0. If the output of subtracter 34 is not 0, then it is assumed that a change has occurred at that location over a frame time interval. However, only changes exceeding the threshold value are treated as motion indications, the assumption being made that lesser valued changes are due to noise. Although a frame time interval was used in the embodiment illustrated above to detect image motion, other image intervals, such as a field time interval may also be used. Also, signals representing pixels within the currently received field may also be used to detect image motion.

Referring again to FIG. 1 in the above embodiment, in the absence of image change, the frame comb filtered luminance $Y_f$ and chrominance $C_f$ signals would be coupled through the respective signal coupling unit 60 and 70 to respective output terminals 15 and 25. In the presence of image change, the line comb filtered luminance $Y_1$ and chrominance $C_1$ signals from line comb filter 20 would be coupled through respective signal coupling units 60 and 70 to respective output terminals 15 and 25.

In an alternative embodiment, the threshold detector 38 may be replaced with an absolute value circuit which provides the magnitude m of the filter output. The output signal m from detector 30, in this instance, controls the relative proportion of frame comb and line comb filtered luminance and chrominance signal supplied to the output terminals 15 and 25 in accordance with the relative magnitude of the signal m. For example, if the signal m from motion detector 30 indicated a relatively large magnitude of image change, then signal coupler elements 60 and 70 would couple a relatively large proportion of line comb filtered luminance and chrominance signals and a relatively small proportion of frame comb filtered luminance and chrominance signals to the output terminals 15 and 25 respectively. If the signal from motion detector 30 indicated a relatively small magnitude of image change, then signal coupler units 60 and 70 would couple a relatively large proportion of frame comb filtered luminance and chrominance signals and a relatively small proportion of line comb filtered luminance and chrominance components to the output terminals 15 and 25 respectively. One such arrangement is illustrated in FIG. 5 of U.S. Pat. No. 4,530,004 entitled "Color Television Signal Processing Circuit" issued July 16, 1985 to Achiha et al.

The signal m from detector 30 is coupled to a control signal generator 40 which generates an output signal $K_m$. Generator 40 may include circuitry which only passes motion signals, $K_m$, that occur for a predetermined minimum duration. For example, generator 40 will examine successive sequences of detected signals and pass the detected signals only if a predetermined number of such signals indicate motion. In particular, generator 40 may only pass motion indicative signals if motion is detected in at least e.g. seven adjacent pixels or e.g. seven out of eight adjacent pixels. In this mode generator 40 functions to discriminate motion from impulse noise. For the case where detector 30 provides magnitude values, generator 40 may include circuitry, such as a read-only-memory, to provide a predetermined limited number of output values, $K_m$, representative of ranges of values of the signal m, which ranges may be linear or non-linear subdivisions of the entire range of values of signal m.

The control signal $K_m$ from control signal generator 40 is supplied to signal spreader 50 which reduces the visible artifacts that occur as a result of the transition from motion-absent to motion-present processing. Signal spreader 50 generates a signal K which controls the relative proportions of frame comb filtered and line comb filtered luminance and chrominance signals in the luminance Y and chrominance C output signals. Signal spreader 50 will be described in more detail below.

The luminance components from the frame comb filter 10 ($Y_f$) and the line comb filter 20 ($Y_1$) are combined in proportions controlled by the signal K from motion signal spreader 50 in signal combiner 60. For example, K may represent a proportion between 0 and 1 and signal coupler 60 may couple the sum of K times the signal at input terminal A plus (1-K) times the signal at input terminal B to the output terminal 15. When K=0, only line comb filtered luminance signals ($Y_1$) are coupled to the output terminal 15, and when K=1, only frame comb filtered luminance signals ($Y_f$) are coupled to the output terminal 15. For K between 0 and 1, a mixture of frame comb and line comb filtered luminance signals, in proportion based on K, is coupled to the output terminal 15.

Signal coupler unit 70 operates in a similar manner to couple a mixture of the frame comb filtered chrominance $C_f$ from frame comb filter 10 and the line comb filtered chrominance signal $C_l$ from the line comb filter 20 to the output terminal 25.

Delay elements 55 and 65, coupled between the input terminal 5 and the frame comb filter 10 and line comb filter 20 respectively, are provided to compensate for the processing delay times of pixel motion detector 30, control signal generator 40 and the signal spreader 50.

Figure 3:
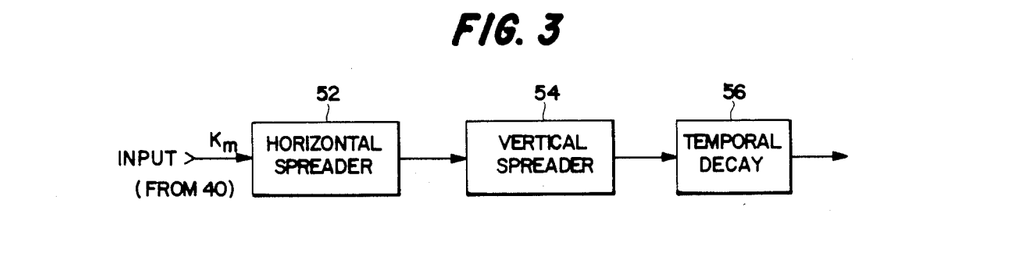
FIG. 3 is a block diagram of a control signal spreader which may be used in the apparatus illustrated in FIG. 1.

FIG. 3 illustrates a signal spreader 50 which may be used in the system illustrated in FIG. 1. In FIG. 3, an input terminal is coupled to the output terminal of control signal generator 40 (of FIG. 1), and an output terminal is coupled to the control input terminals of signal combiners 60 and 70 (of FIG. 1). Coupled between the input and output terminal is the serial connection of a horizontal spreader element 52, a vertical spreader element 54 and a temporal decay element 56. Because the operation of each of these elements is independent of the operation of the others, they may be coupled in any order.

In operation, signal spreader 50 receives the control signal $K_m$ from the control signal generator 40. This control signal indicates the presence or absence of motion in the region of the current pixel. In order to ameliorate the artifact which would be generated if a hard switch was made from the no-motion region to the motion region, signal spreader 50 controls signal combiners 60 and 70 (of FIG. 1) in the following manner.

Figure 4A:
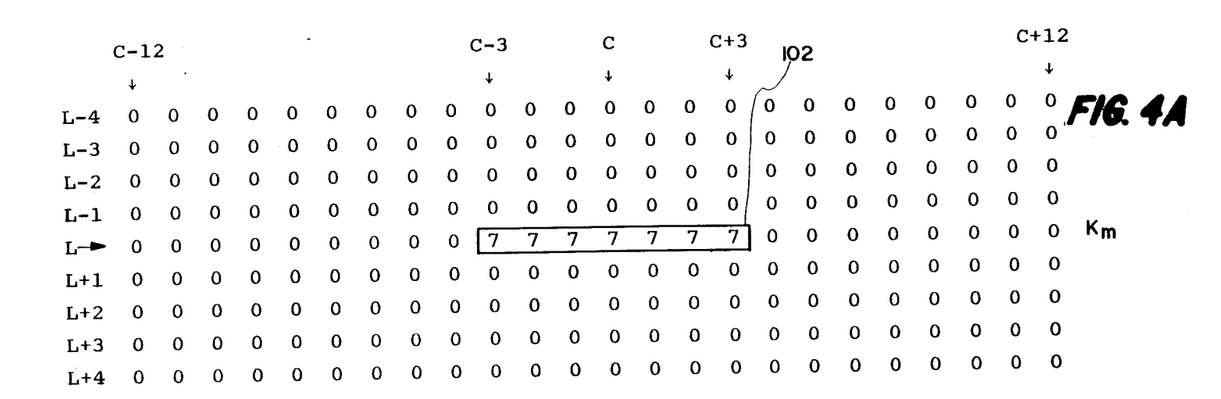
FIGS. 4A, 4B, 4C and 4D are diagrams illustrating the spatial representation of pixels in a field of an image and are useful in understanding the operation of the signal spreader illustrated in FIG. 3.

FIG. 4A illustrates a portion of the motion signals for pixel locations of a reproduced image and indicates the decimal magnitude value of the various signals in FIGS. 1 and 4. It is assumed in the discussion below, that the embodiments are implemented in multibit digital circuitry.

FIG. 4A illustrates the value of the control signal $K_m$ at various pixel locations. In FIG. 4A, two assumptions have been made. First, a motion indication signal occurs for seven consecutive pixel locations on horizontal line L. Second, the control signal generator 40 is arranged to output the values zero and seven to indicate no-motion and motion respectively. In the pixel array illustrated in FIG. 4A, image change has been detected within a box 102 in the middle of the portion of the image illustrated.

Figure 4B:
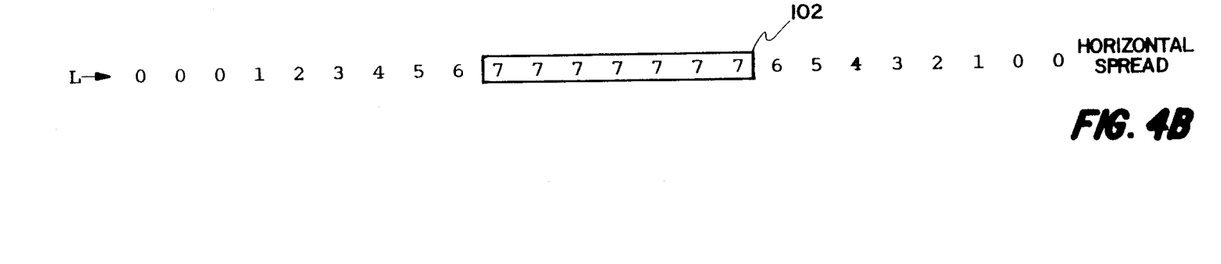

Referring to FIG. 3, the signal $K_m$ from control signal generator 40 (of FIG. 1) is supplied to signal spreader 50 and is processed by horizontal spreader element 52. FIG. 4B illustrates the result of the horizontal spreading. For simplicity, only line L is illustrated in FIG. 4B. As can be seen, box 102 still delineates the region where motion has been detected and the pixels within box 102 still have the value 7. However, the control signal decreases symmetrically in the horizontal direction by decrements of 1 until a control signal having the value 0 is reached in columns C−10 and C+10.

Figure 4C:
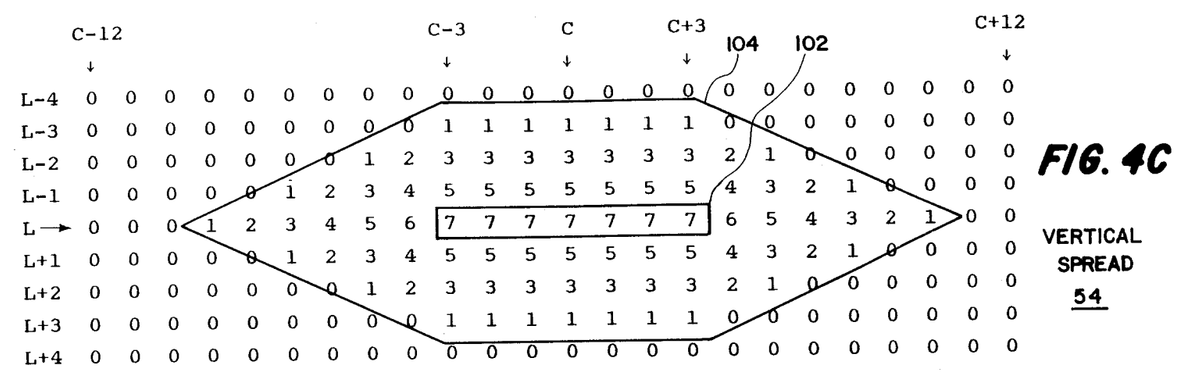

This horizontally spread control signal from horizontal spreader element 52 is then supplied to vertical spreader element 54. In FIG. 4C, box 102 still illustrates the region of the received image in which motion has been detected and the control signal still has the value 7 in that region. However, the control signal decreases symmetrically in the adjacent lines above and below line L by decrements of 2, until a control signal having a value of 0 is reached in lines L+4 and L−4. This is done on a column by column basis. In the region defined by line 104, a control signal indicating motion (in region 102) is spread in the horizontal and vertical region in a symmetrically decreasing manner. In this way, the control signal gradually increases until the region in which motion is detected (102) is scanned and then gradually decreases going away from that region.

Figure 4D:
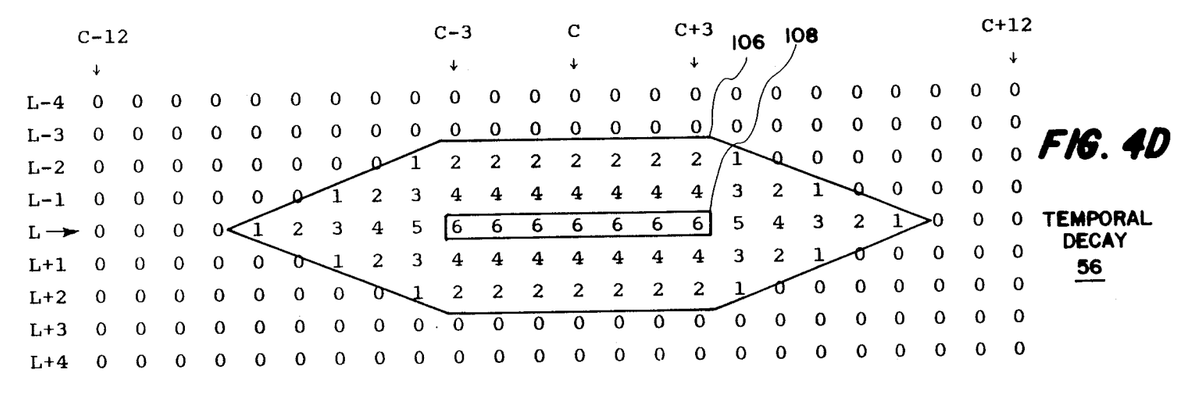

FIGS. 4A, 4B and 4C all illustrate the value of the control signal in the same frame as that in which motion has been detected in region 102. The output of vertical spreader element 54 is supplied to a temporal decay element 56. Temporal decay element 56 produces a control signal which gradually decays over time. The portion of the image illustrated in FIG. 4D is that illustrated in FIG. 4C delayed by one frame. The value of the control signal at every pixel location in the frame illustrated in FIG. 4C has been decremented by 1 to a minimum of 0. A resulting region defined by line 106 illustrates that the value of the control signal is decreasing in the neighborhood of detected image change, and the area of the non-zero region is decreasing. Region 108 defines the region in which image change was originally detected as illustrated as box 102 in FIGS. 4A, 4B and 4C. Succeeding frames will decay in a similar manner until in the eighth frame following that illustrated in FIG. 4A the value of the control signal at all pixel locations will have diminished to 0 and no image motion correction will be performed.

Figure 5:
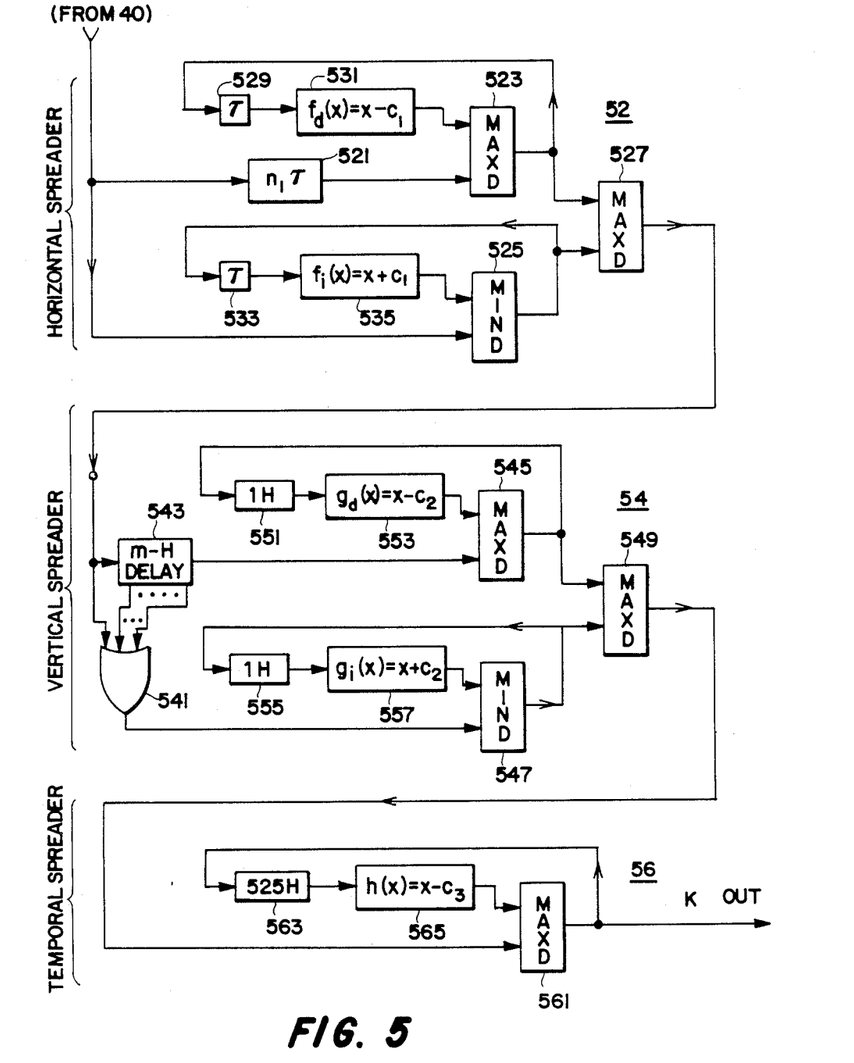
FIG. 5 is a block diagram of a particular implementation of a signal spreader illustrated in FIG. 3.

FIG. 5 illustrates a signal spreader 50 which may be used in the apparatus illustrated in FIG. 1. The top portion of this apparatus illustrates horizontal spreader element 52, the middle portion illustrates vertical spreader element 54 and the bottom portion illustrates temporal decay element 56.

An input terminal is coupled to control signal generator 40 (of FIG. 1). This input terminal is coupled to a delay element 521 and a first input terminal of a minimum detector (MIND) 525. The output of delay element 521 is coupled to a first input of a maximum detector (MAXD) 523. The output of maximum detector 523 is coupled to a first input terminal of a maximum detector 527 and an input terminal of a delay element 529. The output of delay element 529 is coupled to an input terminal of a decreasing function element 531, which is in turn coupled to a second input terminal of maximum detector 523.

The output of minimum detector 525 is coupled to a second input terminal of maximum detector 527 and an input terminal of a delay element 533. The output of delay element 533 is coupled to an input of an increasing function element 535 which in turn is coupled to a second input terminal of minimum detector 525. The output of maximum detector 527 is a signal which represents the horizontally spread control signal.

In FIG. 5, the elements designated MIND are elements which provide, at their respective output connections, the lesser valued input signal applied to the two input connections. Elements designated MAXD are elements which provide, at their respective output connections, the greater valued input signal applied to the two input connections.

Horizontal spreader 52 consists of two parts. The lower portion of horizontal spreader 52, consisting of minimum detector 525, delay element 533 and increasing function circuit 535, produces a slowly increasing value which reaches a maximum value equal to the value applied by generator 40 when a region of motion has been detected. The upper part of horizontal spreader 52, consisting of delay element 521, maximum detector 523, delay element 529 and decreasing function element 531, produces a slowly decreasing value which reaches the minimum value 0.

The amount by which the control signal increments or decrements on either side of the region in which motion is controlled by the constant $C_1$. Increasing function generator 535 produces a function $f_i(x) = x + C_1$ and decreasing function generator 531 produces a function $f_d(x) = x - C_1$d 1. To produce the signals illustrated in FIGS. 4A–4D, $C_1$ is equal to 1. Constant $C_1$ also determines the number of intermediate pixels between 0 and the maximum K value. Delay elements 529 and 531 each provide a one pixel delay time and delay element 521 produces a multiple pixel delay interval equal to the number of pixels over which the signal increases from 0 to 7. In the case of the signals illustrated in FIG. 4, $n_1$ is equal to 7.

When the input signal from control signal generator 40 is a 0 (and has been a 0 for a sufficient amount of time for the output signal of horizontal signal spreader 52 to decay to 0), then the input signal to minimum detector 525 from the control signal generator 40 is 0. The output signal from minimum detector 525 is fed through pixel delay element 533 and through the increasing function generator 535 which adds one to the input signal, producing an output signal having the value 1. The output of minimum detector is the minimum of the two inputs and is therefore a 0. The output signal from minimum detector 525 is supplied as one input signal to the maximum detector 527.

When control signal generator 40 detects the presence of motion, a signal having a value 7 is supplied to one input terminal of minimum detector 525. Assuming that this value exists for a sufficient length of time, the output of function generator 535 will be a sequence of increasing values from 1 to 8. Minimum detector 525 will pass those increasing values until its output becomes 7. In the next pixel period, the output of function generator 535 becomes 8 but the signal from control signal generator 40 is a 7 and the output of minimum detector 525 remains a 7. In the case illustrated in FIG. 4, this increase from 0 to 7 takes 7 clock periods.

Multiple pixel delay element 521 delays the motion-detected signal from control signal generator 40 for 7 clock periods. During that time, the output signal from maximum detector 523 has the value 0. The 0 signal is supplied to the other input terminal of maximum detector 527 which selects the larger of its two inputs and thus generates a gradually increasing signal at its output.

On the seventh pixel interval, after the occurrence of the motion signal from control signal generator 40, a signal having the value 7 is presented at the input terminal of maximum detector 523 from the output terminal of the multiple pixel delay element 521. This signal is supplied to the decreasing function generator 531 through a pixel delay element 529. A signal having the value 6 is generated at the output terminal of the function generator 531 and is supplied at the other input terminal of maximum detector 523 which passes the value 7 through to maximum detector 527.

When motion is no longer detected at control signal generator 40, then a 0 is supplied to minimum detector 525 which passes the 0 value signal through to maximum detector 527. The output of the maximum detector 523, however, is still a 7. Over the course of the clock periods it takes for the 0 value to propagate through the multiple pixel interval delay element 521, its output remains a 7. However, when the 0 has propagated through delay element 521, the output of maximum detector 523 is decreased by the decreasing function generator 531 until a 0 is reached. This decreasing function is passed through maximum detector 527 and produces a slowly decreasing signal after motion has been found absent by control signal generator 40. The signal illustrated in FIG. 4B is thus produced by horizontal spreader 52 illustrated in FIG. 5.

The output signal from maximum detector 527, representing the output signal of the horizontal spreader 52, is coupled to an input terminal of the vertical spreader 54. The input terminal of the vertical spreader is coupled to an input connection of a second delay device 543 and an output terminal of delay device 543 is coupled to a first input terminal of a maximum detector 545. An output terminal of maximum detector 545 is coupled to a first input terminal of a maximum detector 549 and an input terminal of a one horizontal line interval delay element 551 which has an output terminal coupled to a second input terminal of maximum detector 545 through a decreasing function generator 553.

Delay device 543 provides a signal delay of an integral number of horizontal periods between its input and output. In addition, delay device 543 has taps to provide signals delayed by successive integer horizontal periods. The input to delay device 543 and each of the taps are coupled to respective input connections of an OR gate 541. Note, OR gate 541 is actually a plurality of OR gates each of which processes one of the bits of the multibit motion signal.

The output terminal of OR gate 541 is coupled to an input terminal of minimum detector 547. An output terminal of minimum detector 547 is coupled to a second input terminal of maximum detector 549 and an input terminal of a one horizontal line interval delay element 555. An output terminal of horizontal line interval delay element 555 is coupled to a second input terminal of minimum detector 547 through an increasing function generator 557. The output signal from maximum detector 549 represents the output from the vertical spreader 54.

Vertical spreader 54 operates in a similar manner to that of horizontal spreader 52 described above with one primary difference. The motion signal coupled to minimum detector 525 is continuous over at least a predetermined number of pixel times. Since this signal is continuous and nominally larger than the value provided by the function generator 535, minimum detector 525 will continuously respond to the lesser values provided by the function generator over the build up period. It is seen in the examples of FIGS. 4A and 4B that vertically there are no contiguous motion signals. Thus, if such a signal were applied directly to minimum detector 547, during the line that the value seven is coupled to its lower input, the output of minimum detector 547 is determined by function generator 557. In subsequent lines minimum detector 547 will output zero. Thus, there will be no build up. The decaying signal provided by maximum detector 545 will, however, be as desired. To overcome this difficulty, two approaches may be taken. The first is to ensure that only motion signals having a minimum number of vertically adjacent motion indications be applied. This discrimination may be performed by signal control generator 40, or by an element inserted between the horizontal and vertical spreaders. In this instance, the OR gate 541 is not required and the input signal to spreader 54 is coupled directly to minimum detector 547.

The second solution is provided by OR gate 541 coupled to tapped delay device 543. At the successive taps the input motion signal is replicated during successive horizontal periods. OR gate 541 combines these signals to effectively provide vertically contiguous motion signals over the period required to provide the desired incremental buildup of the motion signal.

Increasing function generator 557 produces a function $g_i(x)=x+C_2$ and decreasing function generator 553 produces a value $g_d(x)=x-C_2$ where $C_2$ represents the increment by which the value of the vertically spread control signal changes. For the system illustrated in FIG. 4, $C_2=2$.

The output signal from maximum detector 549 represents the horizontally and vertically spread control signal illustrated in FIG. 4C. This signal is generated in the field in which motion has been detected by control signal generator 40. This signal is fed to a temporal decay element 56.

The output terminal of maximum detector 549 is coupled to a first input terminal of a maximum detector 561. An output terminal of maximum detector 561 is coupled to respective control input terminals of signal combiners 60 and 70 (of FIG. 1) and to an input terminal of a frame delay element 563. An output terminal of frame delay element 563 is coupled to a second input terminal of maximum detector 561 through a decreasing function generator 565.

Temporal decay element 56 operates in a similar manner to the upper portions of horizontal spreader 52 and vertical spreader 54. Decreasing function generator 565 produces a function $h(x)=x-C_3$. $C_3$ is a constant which controls the decay period of the control signal. For the system illustrated in FIG. 4D, $C_3=1$.

Although the decreasing function generators 531, 553, and 565 have all exhibited linear functions which subtract a constant from the input signal, the function may instead be a non-linear function of the input signal, provided that the output signal decreases in value. Increasing function generators 535 and 557 may exhibit any function which increases in value.

Function generators 531, 535, 553, 557 and 565 may be realized with read only memories (ROM's) operated as functional elements. The respective ROM's will be programmed to output values which are appropriately larger or smaller than values applied to their input address port depending upon whether the element has an increasing or decreasing function respectively.

A critical inspection of FIG. 4C will reveal that the increasing function generator 557, increments the first value by one and subsequent values by two, in order to produce a symmetrical result to that of decreasing function generator 545. For an example, such as the one described a ROM is particularly conducive to performing the function of increasing function generator 557 to produce the two valued increments.

Alternatively, the increasing function elements may be simple accumulators arranged to accumulate a predetermined number of particular constant values, and the decreasing function elements may be subtracter circuits arranged to subtract predetermined constants from the recirculated values.

In the temporal decay section, delay element 563 is indicated as including a frame delay interval. This element can be approximately halved to save hardware. In this instance, delay element 563 will be arranged to provide delay intervals of 263H and 262H in alternate field intervals.

Although the embodiment which has been described relates to spreading an image change signal, the control signal could be any parameter of the received image such as the chrominance amplitude or noise level of the received signal.

Apparatus in accordance with the principles of the present invention may be implemented in either sampled data or continuous form and the sampled data form may be implemented in either the analog or digital domain.

What is claimed is:

1. Apparatus for spreading a control signal related to a detected condition of a signal, said apparatus comprising:
    a control signal input terminal;
    first means coupled to said control signal input terminal and responsive to a transition in a first direction of said control signal for generating a signal which incrementally changes over time in said first direction and providing the lesser valued one of said control signal and said incrementally changing signal;
    delay means coupled to said control signal input terminal for delaying the signal applied thereto;
    second means, coupled to said delay means and responsive to a transition, of opposite direction to said first direction, of the control signal delayed by said delay means, for generating a signal which incrementally changes over time in said opposite direction and providing the greater valued one of said control signal and the incrementally changing signal generated thereby;
    means, coupled to said first and second means, for selecting and providing to an output terminal, the signal generated by said first or second means having the greater magnitude.

2. Adaptive processing apparatus for processing a video signal formatted in field/frames, each field/frame representing a matrix of pixels arranged in horizontal lines, said apparatus including means for detecting a predetermined condition of said video signal and generating a control signal having a duration extending at least over the duration of pixels for which said predetermined condition exists, and means responsive to said control signal for adaptively processing said video signal, aid apparatus further including means for protracting the effect of said control signal comprising:
    first means for broadening said control signal in a dimension along said horizontal lines including;
        control signal input and output terminals;
        a minimum detector having first and second input terminals and an output terminal, for passing to said output terminal, the lesser valued input signal applied to its first and second input terminals;
        means, coupled between the output and first input terminals of said minimum detector, for delaying and increasing the magnitude of the signal applied thereto;
        first and second maximum detectors respectively having first and second input terminals and respective output terminals, said maximum detectors for passing to their respective output terminals, the greater valued signal applied to their respective first and second input terminals;
        means, coupled between the output and first input terminal of said first maximum detector, for delaying and decreasing the magnitude of the signal applied thereto;

respective means for coupling said control signal input terminal to the respective second input terminals of said first maximum detector and said minimum detector;

respective means for coupling the output terminals of said first maximum detector and said minimum detector to the first and second input terminals of said second maximum detector respectively;

means for coupling said output terminal of said second maximum detector to said control signal output terminal;

second means for broadening said control signal in a dimension normal to said horizontal lines such that said control signal occurs in horizontal lines in which said predetermined condition is not detected; and means for serially coupling said first and second means between said means for generating said control signal to said means for adaptively processing.

3. The apparatus set forth in claim 2 wherein said second means comprises:

control signal input and output terminals;

a further minimum detector having first and second input terminals and an output terminal;

third and fourth maximum detectors each having first and second input terminals and an output terminal;

means, coupled between the output and first input terminals of said further minimum detector, for delaying by integral horizontal periods, and increasing the magnitude of the signal applied thereto;

means, coupled between the output and first input terminals of said third maximum detector, for delaying by integral horizontal periods, and decreasing the magnitude of the signal applied thereto;

means for coupling the output terminals of said further minimum detector and said third maximum detector respectively to the first and second input terminals of said fourth maximum detector, said fourth maximum detector providing an output signal at said output terminal of said second means;

means for coupling said control signal input terminal to the second input terminal of said further minimum detector; and delay means coupled between said control signal input terminal and the second input terminal of said third maximum detector.

4. Apparatus for extending a control signal, related to a detected condition of a video signal; said apparatus comprising:

control signal input and output terminals;

a minimum detector having first and second input terminals and an output terminal, for passing to said output terminal, the lesser valued input signal applied to its first and second input terminals;

means, coupled between the output and first input terminals of said minimum detector, for delaying and increasing the magnitude of the signal applied thereto;

first and second maximum detectors respectively having first and second input terminals and respective output terminals, said maximum detectors for passing to their respective output terminals, the greater valued signal applied to their respective first and second input terminals;

means, coupled between the output and first input terminal of said first maximum detector, for delaying and decreasing the magnitude of the signal applied thereto;

respective means for coupling said control signal input terminal to the respective second input terminals of said first maximum detector and said minimum detector;

respective means for coupling the output terminals of said first maximum detector and said minimum detector to the first and second input terminals of said second maximum detector respectively; and means for coupling said output terminal of said second maximum detector to said control signal output terminal.

5. The apparatus set forth in claim 4 further including:

a control signal input terminal;

a further minimum detector having first and second input terminals and an output terminal;

third and fourth maximum detectors each having first and second input terminals and an output terminal;

means, coupled between the output and first input terminals of said further minimum detector, for delaying by integral horizontal periods, and increasing the magnitude of the signal applied thereto;

means, coupled between the output and first input terminals of said third maximum detector, for delaying by integral horizontal periods, and decreasing the magnitude of the signal applied thereto;

means for coupling the output terminals of said further minimum detector and said third maximum detector respectively to the first and second input terminals of said fourth maximum detector, said fourth maximum detector providing an output signal for said second means;

means for coupling said control signal input terminal to the second input terminal of said further minimum detector; and delay means coupled between said control signal input terminal and the second input terminal of said third maximum detector.

6. Adaptive processing apparatus for processing a video signal occurring in sequences of horizontal lines of image information representing an image, said apparatus comprising:

a video signal input terminal for receiving said video signal;

a motion detector, coupled to said video signal input terminal, for generating signals indicating the occurrence of motion in said image information;

discriminator means, coupled to said motion detector, for generating a motion signal only if the signals indicating the occurrence of motion, indicate that motion has occurred over a segment of said image which is greater than a predetermined minimum area, said minimum area being greater than a pixel area;

means coupled to said discriminator means for broadening said motion signals.

* * * * *